G. W. MATHEWS.
SECTION OR BLOCK FOR SEWER OR CONDUIT CONSTRUCTION.
APPLICATION FILED OCT. 10, 1914.
1,197,140.
Patented Sept. 5, 1916.
2 SHEETS—SHEET 1.
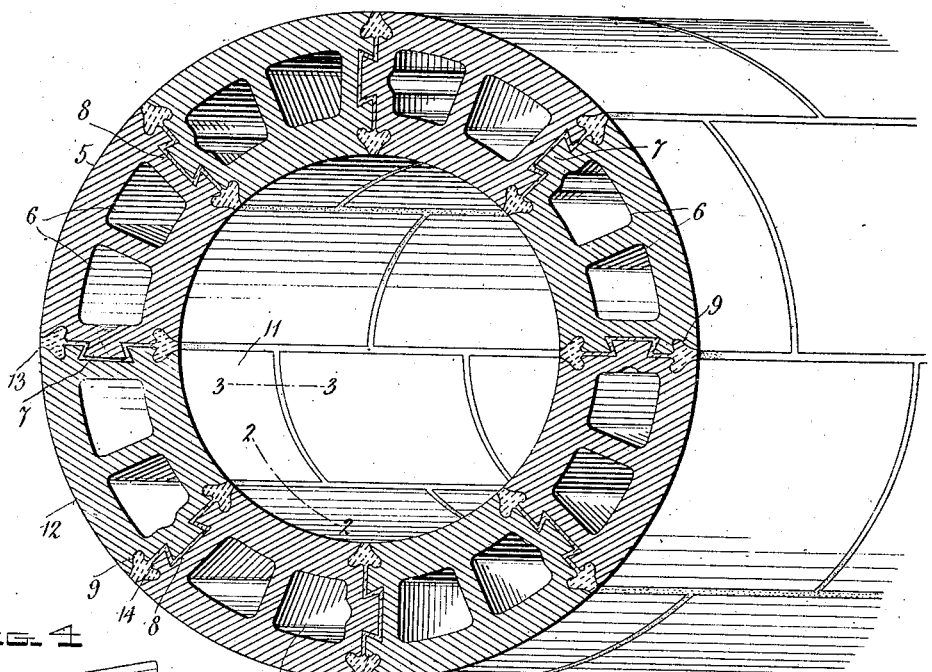
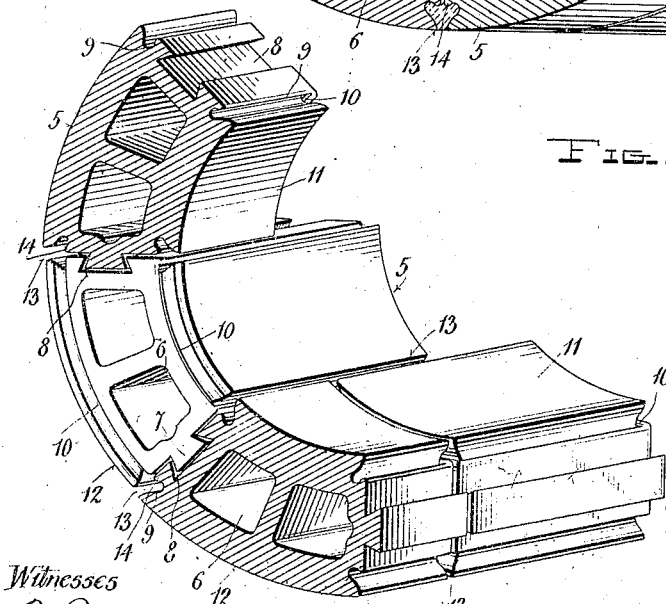
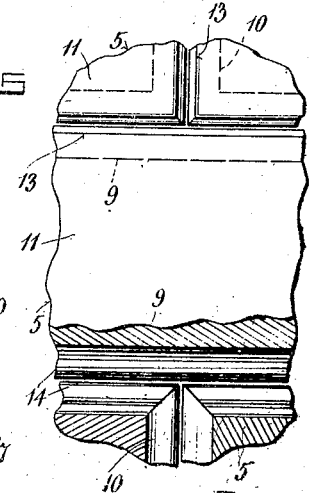
Witnesses
Inventor
George W. Mathews,
by
Attorney.

G. W. MATHEWS.
SECTION OR BLOCK FOR SEWER OR CONDUIT CONSTRUCTION.
APPLICATION FILED OCT. 10, 1914.
1,197,140.
Patented Sept. 5, 1916.
2 SHEETS—SHEET 2.
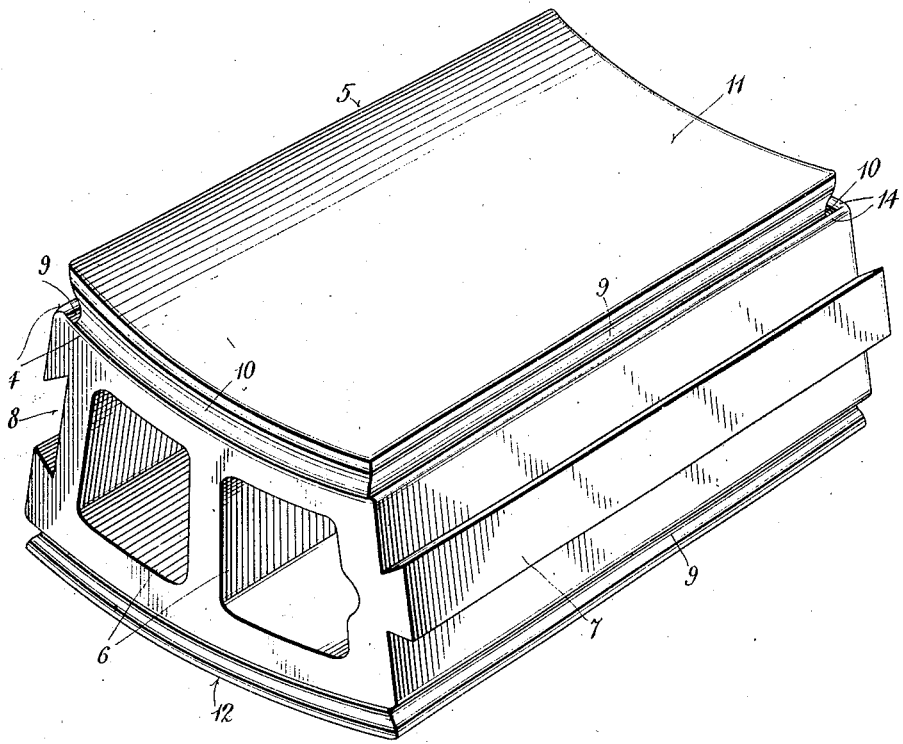
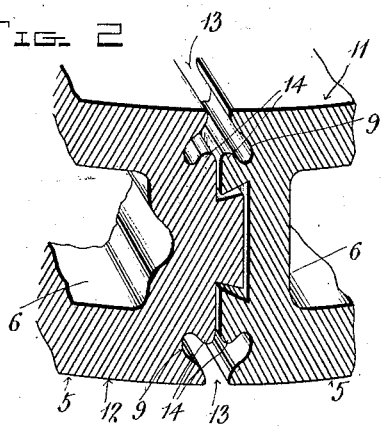
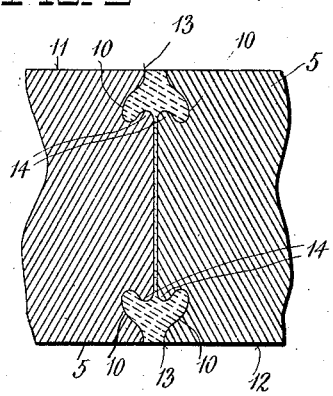
Witnesses
Inventor
George W. Mathews,
by
Attorney

UNITED STATES PATENT OFFICE.

GEORGE W. MATHEWS, OF MACON, GEORGIA, ASSIGNOR TO RICHARD E. FINDLAY, OF MACON, GEORGIA.

SECTION OR BLOCK FOR SEWER OR CONDUIT CONSTRUCTION.

1,197,140.    Specification of Letters Patent.    Patented Sept. 5, 1916.

Application filed October 10, 1914. Serial No. 866,103.

*To all whom it may concern:*

Be it known that I, GEORGE W. MATHEWS, a citizen of the United States, residing at Macon, in the county of Bibb and State of Georgia, have invented new and useful Improvements in Sections or Blocks for Sewer or Conduit Construction, of which the following is a specification.

This invention relates to improvements in the construction of conduits, such as sewers, etc., embodying vitrified segmental or other sections, and the primary object is to provide a section or block which when properly assembled with other similar sections will form a practically continuous curved wall and adapted for use in organizing sewers or other tubular conduits, and while it is preferred that the several segmental sections embodied in the organization of the sewer pipe or conduit be regularly curved so as to conjointly form a circular structure, it will be understood that the sections may be curved in different arcs or may be otherwise shaped to produce a sewer or conduit that is elliptical, for instance, in cross-section or that may have an angular cross-sectional contour.

A further object of the invention is to so construct the various segmental sections that each will be provided not only with interlocking means at intermediate points in the sides and ends thereof so as to hold the sections securely in position when laid or assembled, but also to construct the said sections with key grooves at the outer and inner portions of their edges or between the intermediate interlocking means and the planes of the outer and inner surfaces of the sections and to provide the said key grooves with distinct ribs so that the united grooves of contiguous sections provide key seats having maximum lateral extensions or enlargements within the bodies of the sections and contracted openings accessible from the exterior and interior of the pipe or conduit structure for filling the said seats with cement or other material and thereby produce a tight non-leaking joint around each section which is not dependable solely on the adhesion of the cement filling relatively to the walls of the seats to obstruct lateral separation of the several sections, but embodying positive means by reason of the seat ribs which lock the cement filling as well as the sections and whereby a tight non-leaking joint around each section is produced and a durable sewer pipe or conduit organization possessing that amount of rigidity which is necessary to successfully resist strains and displacement of the sections, particularly at points which are inaccessible after completion of the sewer or conduit results.

A further object of the invention is to provide segmental or other blocks or sections that may be readily associated and having interengaging end and side joint elements at intermediate points as well as key grooves continuously around the sides and ends adjacent to the outer and inner surfaces of the blocks or sections or between the said end and side joint elements and the planes of the outer and inner surfaces of the blocks or sections, the latter being of such form and proportions that they may be laid in break joint relation so as to intercept or obviate the production of long joints between the blocks or sections, with material advantage in the formation of the sewer pipe or conduit and also in the prevention of leakage at any point throughout the sewer pipe or conduit structure.

A still further object of the invention is to provide a vitrified segmental block or section for the construction of conduits, sewers, etc., which may be readily assembled to produce a construction which will not become weakened or the sealing joints become broken at the time of the settlement of the blocks or sections in their final bearing, this result being obtained by the manner in which the blocks are formed and the method of introduction of the sealing or locking joints therein and which can be completed at any time after the entire conduit is otherwise completed and has received the load of back filling of the trench which forces the blocks or sections into the bearing and position which they will permanently occupy and causing the blocks through the particular form of sealing joints, after the cement filling in the latter becomes set, to resist any tendency to separation in view of a positive anchorage of the cement filling in the key grooves and independent of adhesion of the cement filling.

With the foregoing and other objects and advantages in view, which will appear in the subjoined description, the invention consists in the construction, arrangement and combination of parts which will be hereinafter described and claimed and subject to such changes in the precise embodiment of the invention herein disclosed as may be permitted within the scope of the claims and without departing from the spirit of the invention.

In the drawings: Figure 1 is an isometrical perspective of a portion of a sewer pipe or conduit made up of the segmental hollow sections or blocks embodying the features of the invention. Fig. 2 is a section taken in the plane of the line 2—2, Fig. 1. Fig. 3 is a section taken in the plane of the line 3—3, Fig. 1. Fig. 4 is a detail sectional perspective view of a series of the hollow segmental sections or blocks particularly showing the manner of assembling the same. Fig. 5 is a plan view of a portion of a sewer pipe or conduit made up of the improved hollow segmental sections or blocks looking from the interior of the pipe or conduit and showing one side broken away and in horizontal section. Fig. 6 is a detail perspective view of one of the improved hollow segmental sections or blocks.

This application constitutes a continuation in part of my application Serial No. 855,299, filed August 5, 1914, and in the present instance the same essential features of the invention are embodied as in the above noted application with developments which particularly pertain to the key seats or grooves disposed at the opposite sides and in the ends of the several segmental sections or blocks and mainly differentiate the improvement from the prior structure by providing a positive structural resistance forming a part of each key seat or groove that operates to obstruct lateral or sidewise separation or disjointure of the several sections or blocks when associated and without relying solely on the adhesive characteristics of the cement filling or cementitious sealing material to perform this function.

The numeral 5 designates the improved hollow segmental section or block which may be constructed as shown by Figs. 1 and 4, in whole and half lengths, so as to facilitate the formation of break joints between the contiguous sections or blocks. By preference the sections or blocks 5 will be of segmental form or curved in the arcs of circles, but it will be understood that they may be of other or angular form, or of arcuate contour other than the arcs of circles, the form of the sections or blocks depending upon the character or the general shape or contour of the sewer pipe or conduit to be constructed. Each section or block 5 is provided with openings or ducts 6 extending longitudinally therethrough from end to end, these openings or ducts registering in the complete pipe or conduit organization as will be readily understood. The number of passages or ducts 6 formed in the sections or blocks may be varied at will as will be readily understood in the art. The preferred form of the hollow segmental section or block is shown particularly by Fig. 6, and the interfitting relation of the several sections or blocks is shown in the remaining figures, which illustrate both the end and side joints. Each segmental section or block has on one side a dovetail projection 7 extending longitudinally full length thereof and at an intermediate or central point, and the opposite side of the block has a dovetail groove 8 to receive the dovetail projection 7 of a contiguous section or block. By means of the dovetail projections and grooves 7 and 8 the sections or blocks may be reliably interlocked when assembled, and, moreover, the said projections and grooves form intermediate locking means for the sections or blocks.

The principal or essential feature of the invention consists in the construction of grooves 9 and 10 in the inner and outer portions of the sides and ends of each section or block at regular distances inwardly relatively to the plane of the inner and outer surfaces 11 and 12 of the sections or blocks. The grooves 9 and 10 are continuous, or extend fully around the sides and ends of each section or block, the said grooves forming approximately one-half of a complete key groove which is produced when the several sections or blocks are assembled conterminally and side by side in organizing or building up a pipe or conduit. The key grooves 9 and 10 have their maximum lateral extent inwardly in transverse relation to the portions of the sections or blocks in which they are formed, and when the sections or blocks are assembled and the key grooves completed as shown by Figs. 1, 2, 3 and 4, contracted inlet openings 13 are formed with relation to the completed grooves and respectively open inwardly into the pipe or conduit and outwardly with relation to the outer surface of said pipe or conduit. These contracted inlet openings or feed throats for the completed key grooves extend both longitudinally and transversely with relation to the pipe or conduit when the sections or blocks are properly assembled, and by this means sealed joints can be produced between the sides and ends of the assembled sections or blocks after the latter are all in proper position relatively to each other and fully settled in place.

From the foregoing it will be seen that each section or block is provided with an intermediate or side locking means and also with auxiliary key locking means which are formed both in the sides and ends at points between the planes of the side locking means and the inner and outer surfaces of each section or block, and the auxiliary locking means or key seat grooves 9 and 10 not only make it possible to produce a tight and non-leakable joint, but at the same time the said auxiliary locking means serve to hold the sections or blocks against displacement when assembled independently of the intermediate side locking means. In other words, the improved hollow segmental sections or blocks are not dependent solely for their interlocked association when assembled upon the dovetail projections 7 and dovetail grooves 8, as the key seats or grooves 9 and 10 contribute very materially to the locking features of the several sections or blocks. It will also be observed that the auxiliary locking means consisting of the key seats or grooves 9 and 10 extend into or are wholly within the bodies of the several sections or blocks and are formed simultaneously with the remaining structural features of each section or block and without requiring extra labor to produce the same. In other words, when the improved hollow segmental section or block is constructed, all the parts thereof as explained are simultaneously produced, and it should be understood that the key seats or grooves 9 and 10 do not operate to hold any surface covering, cement or other filling, but to effect a joint lock and filling on opposite sides of an intermediate lock, thus doubly insuring an absolutely tight, non-leakable joint having superior strength and durability and which is readily accessible for completion by a very simple operation. As a material development in this art and particularly in view of the disclosure in my above noted prior application, each key seat or groove 9 and 10 is formed with a locking rib or longitudinal projection 14 which produces a resisting means for the cement filling introduced into the combined seats or grooves 9 and 10 when the sections or blocks are assembled, and through the medium of these ribs or projections, which are contiguously disposed when the sections or blocks are interlocked or joined, the cement filling is anchored in the said seats or grooves and the ribs or projections 14 act to absolutely prevent any lateral or sidewise movement of the sections or blocks relatively to each other in view of the fact that the said ribs or projections have an extent in an outward direction, for instance, relatively to the inner and outer surfaces of the sections or blocks that will dispose portions of the seats or grooves 9 and 10 inwardly beyond the apices of the said ribs or projections. Consequently, it will be understood that the ribs or projections 14 operate to lock the sections or blocks in a positive manner relatively to the cement filling independent of or without relying upon adhesion of the said filling alone to produce the lock. The formation of the intermediate and auxiliary locking means as just explained is also very effective in strengthening the entire pipe or conduit composed of the improved sections or blocks, and in assembling the several sections or blocks it will be understood that the intermediate joints will be sealed by applying cement thereto as in ordinary pipe or conduit structures made up of sections or blocks and the seats or grooves 9 and 10 will also be conjointly filled and the joints at the inner and outer portions between the sides and ends of the blocks will be completed by pressing and smoothing the cementitious material relatively thereto both from the interior and exterior of the pipe or conduit. This is a very important feature in view of the fact that the sections or blocks may be effectively and positively sealed at the joints after all settling movement has taken place, and leakage and displacement of the sections or blocks are thus entirely prevented. In other words, an absolutely tight joint is formed around and between the several sections or blocks, and the whole organization of the pipe or conduit is rendered rigid and exceptionally strong when the cement filling hardens in the key seats or grooves, as it is obvious that the blocks cannot shift laterally either in outward or inward directions, nor can they be depressed below the plane of their normal or desirable contour when assembled or forced inwardly into the interior opening of the pipe or conduit.

Owing to the particular structure of joint as just explained and wherein the cement filling is firmly locked in the seats or grooves 9 and 10, it will be impossible for the said filling to become displaced, either from internal pressure or from exterior pressure. Furthermore, it will be seen that a pipe or conduit may be expeditiously and reliably produced or built up by the use of the improved sections or blocks and after the joints are completed between the sides and ends of the sections or blocks the pipe or conduit will be essentially an integral mass wherein the pressure is uniformly distributed and all strain resisted.

It is obvious that changes in the proportions and dimensions and general details of structure may be made and will be adopted in accordance with the sizes of the pipes or conduits and as the strength and resistance required may demand.

It will be understood that as the blocks are assembled to form the tubular structure the crown of the structure will tend to sag and the waist portions will tend to belly outward as is usual with devices of this character. This settling movement will cause adjacent blocks, considered circumferentially, to adjust themeslves at an angle as previously described and the dovetail joint acts as a pivotal connection which will permit a limited angular movement due to the possible movement of the projection in the space provided between the head of the projecting element of the joint and the adjacent side of the containing recess. This angular adjustment even over a relatively large angle is provided by the spaced apart contiguous sides of adjacent blocks and by the positioning of the key grooves at the ends of the joints. As these key grooves are always open to the outside of the blocks it is possible to fill the same and seal the joints after the blocks have settled in place. Due to the fact that the throat of each dove-tail recess is of less width than the head of the dove-tail projection, the entire separation of the blocks in a direction at right angles to the plane of the joint is prevented.

What is claimed is:

1. A culvert construction comprising blocks laid side by side into a curved wall having an axis of curvature disposed in substantially horizontal position, certain of said blocks arranged to form at least two joints, each disposed in planes substantially parallel to said axis of curvature, the contiguous sides of the blocks forming said joints provided with interlocking means for pivotally connecting said blocks so that they may assume an angular adjustment while settling in position, said means including an extension from one of the blocks, said extension including a broad head and a reduced portion between the broad head and the adjacent side of the block, and the interlocking means including a recess in the other block, said recess having a broad portion designed to contain the broad head of the projection but of greater width than said head to form a space between the head and an adjacent wall of the recess thereby to permit a slight movement of the blocks relative to each other, said recess having a reduced throat of a width less than the greatest width of said head and containing the reduced portion of the extension, said interlocking means designed to prevent the separation of the blocks in a direction at right angles to the line of the joint between the blocks.

2. A tubular construction formed circumferentially of blocks laid side by side in order to form a continuous wall, contiguous sides of certain adjacent blocks being provided with interlocking means for pivotally connecting said blocks to form a joint therebetween, said means including an extension from one of the blocks provided with a broad head and reduced in cross-section toward the adjacent side of the block and the other block provided with a recess containing said head loosely fitted therein to permit some relative movement to the blocks transversely of the plane of the joint, the throat of said recess being reduced and closely fitting the reduced portion of the extension to prevent the separation of said blocks in a direction at right angles to the line of the joint between the blocks, the sides of the blocks at one end of said joint being grooved and co-acting to provide an enlarged recess for permitting the grooved ends of the blocks to approach each other and said recess being open to the outside for receiving a cementitious filler at the end of the joint even after the blocks have set in position.

3. In a device of the class described including a pair of blocks with adjacent sides disposed in juxta-position to form a joint, and provided with an interlocking means for pivotally connecting the blocks, said joint disposed to prevent the entire separation of the blocks in a direction at right angles to the plane of the joint while permitting relative movement of the blocks during settling into position, adjacent edges of said blocks at one side of the joint being recessed and said recesses co-acting to form an enlarged key groove at one end of the joint, and a plastic filler disposed between said blocks and disposed in said enlarged key groove to seal the joint.

4. In a device of the class described, a pair of blocks with contiguous sides provided with a pivotal connection, including a dove-tail projection extending from one of the members and loosely fitting in a dove-tail recess in the other block, the throat of said recess having a relatively close fit with the reduced portion of the projection and other portions of the projection having a relatively loose fit in the recess, said contiguous sides, except said pivotal connection, being normally spaced from each other and a cementitious filler disposed between said spaced apart sides thereby to seal the joint between the blocks, said spaced apart sides being open to the outer side of the assembled blocks thereby permitting the insertion of the filler from the outside of the blocks when interlocked and after they have settled in position.

In testimony whereof I have hereunto set my hand in presence of two subscribing witnesses.

GEORGE W. MATHEWS.

Witnesses:
 CHAS. S. HYER,
 JAMES L. NORRIS.